Patented Nov. 25, 1952

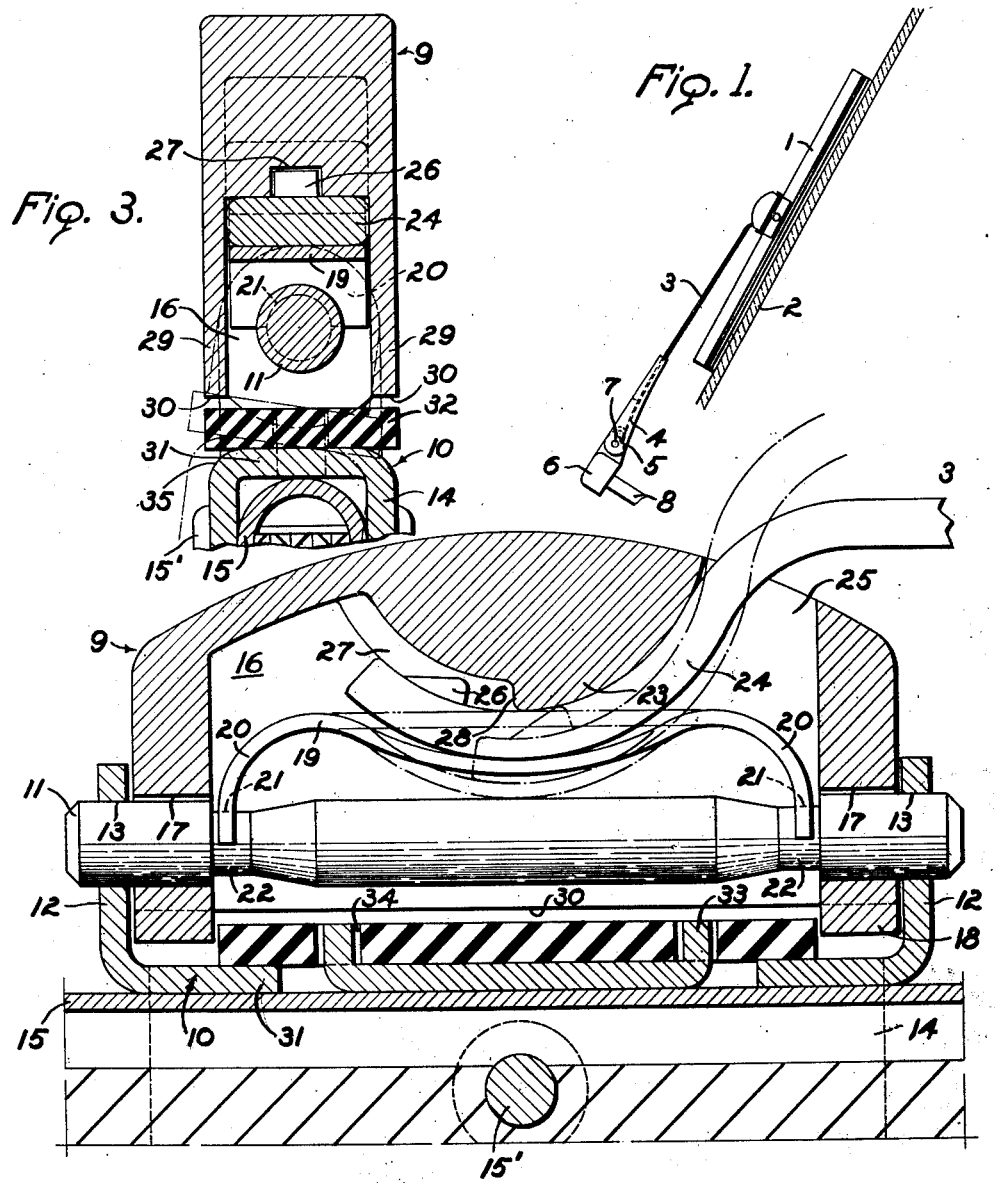

2,618,806

UNITED STATES PATENT OFFICE 2,618,806

CONNECTOR FOR WINDSHIELD WIPER BLADES

Robert B. Macpherson, Buffalo, N. Y., assignor to Trico Products Corporation, Buffalo, N. Y.

Application March 19, 1946, Serial No. 655,637

13 Claims. (Cl. 15—250)

This invention relates to the windshield cleaner art and more particularly to the mounting of the wiping blade upon its actuating arm.

In the modern windshield cleaner the wiping blade is mounted on its arm to flop or rock on its wiping edge at the beginning of each stroke for assuming a rearwardly inclined dragging position with respect to its actuating arm when moved back and forth thereby. The angle of inclination is determined in a manner to avoid any chattering action of the blade upon the glass surface which might impair the vision through the windshield. Previous efforts to control the flop or angular displacement of the blade from the normal have resulted in constructions which might easily be misshaped during assembly or handling and this would alter the prescribed angle of inclination with consequential impairment in the wiping efficiency of the blade.

An important object of the present invention is to provide a blade mounting in which the rocking of the blade on its wiping edge at the beginning of its stroke may be readily controlled and at the same time provided for quietness of operation.

A further and equally important object is to provide a blade mounting clip or attachment which is of simple but durable construction and one which will facilitate its mounting upon the blade in an expeditious manner. Further, the invention has for its aim to provide a novel means of attachment between the clip and its actuating arm by which the wiper will be effectively secured to the arm against accidental displacement.

The foregoing and other objects will manifest themselves as the description progresses, reference being had to the accompanying drawing, wherein:

Fig. 1 is a diagrammatic illustration of the improved wiper operatively supported on a windshield;

Fig. 2 is an enlarged sectional view through the clip and a portion of the blade, with the pivot pin, spring, and arm elements left in elevation; and Fig. 3 is a transverse sectional view of the mounting clip with portions broken away.

Referring more particularly to the drawing, the numeral 1 designates a wiper blade movable back and forth upon the windshield glass 2 by an actuating arm having an outer section 3 urged toward the windshield by a spring 4 which finds support on a part 5 of the inner section 6, the two arm sections being pivotally connected by a pin 7. The arm is fixed to a drive shaft 8 for being oscillated thereby.

The outer end of the arm is attached to the wiper by an articulated clip means comprising an arm engaged section 9 and a blade carried section 10 pivotally joined by a pintle or pin 11, the section 10 having opposed ears 12 apertured to form bearings 13 for receiving the protruding ends of the pin. The part 10 is also formed with depending flanges 14 which straddle the channeled holder 15 of the wiper blade and are secured to the latter by a suitable rivet or other fastener 15'. It therefore becomes apparent that the clip section 10 may be formed with the channeled holder in a one piece unit, and the ears 12 struck out of the back wall of the wiping blade.

The arm engaged section 9 is hollowed to form a chamber 16 through which the pin 11 extends lengthwise thereof, such pin passing through openings 17 forming bearings in the end walls or ears 18 of the chamber to engage in the bearings 13. The chamber 16 receives a flat spring or leaf 19 which extends lengthwise of the pin and has terminal portions 20 resting upon the pin for support thereby. The terminal portions may be formed with arcuate seats 21 to receive the reduced portions 22 of the pin adjacent the end walls 18. By this arrangement the spring serves to lock the pin against accidental displacement from the registering bearings 13 and 17, and thereby maintains the pivotal connection operative at all times. The reduced pin portions 22 provide in effect notches in which the spring terminals 20 engage as keepers to lock the pivot pin in place. Any displacing movement of the pin axially thereof will be resisted by the forward one of the terminal portions 20 abutting against the adjacent end wall 18.

The body portion of the spring intermediate the terminals 20 yieldably rests against the raised convex wall 23 which, as shown in Fig. 2, overlies the spring. Such intermediate body portion will be depressed by the terminal tongue 24 of the arm section 3 when introduced through an entranceway 25 into the chamber 16. The tongue 24 is preferably curved about a transverse axis, and the outer contour of the raised wall 23 is likewise shaped so as to nestingly fit within the curved tongue. This enables the wiper to adjust itself on the arm so that the full length of the wiping edge will contact the windshield.

In order to secure the blade against accidental displacement from the arm, the tongue arm 24 is formed with a lug or shoulder 26 to play in a groove 27 formed in the raised wall 23, a keeper shoulder 28 at the inner end of the groove serving to prevent the tongue from being accidentally withdrawn from the chamber 16. The pin locking spring 19, therefore, functions in a dual capacity by also serving to hold the locking lug 26 operative. Furthermore, the spring nests the raised wall 23 in the terminal tongue of the arm. Another practical function of the spring is to exert a downward pressure on the spring, as viewed in Fig. 2, with a reactionary upward urge on the clip or section 9. This maintains the pin firmly against the lower sides of the openings 17 to absorb slack and looseness in the hinge joint and further applies a braking force on the pin against turning. Consequently, the pin is compelled to turn or journal only in the bearings of the ears 12. This slack-absorbing action of the spring is accentuated by the exaggerated showing of the clearance above the pin in the openings 17.

The mounting clip section 9 is preferably die cast and its chamber 16 opens downwardly, as viewed in Figs. 2 and 3, whereby the opposing side walls of the chamber will form shoulders 30 at opposite sides of and beneath the pivot pin 11. These shoulders being thus disposed beneath the pivotal axis are brought into proximity to the transversely flat back wall 31 of the blade, or its carried clip section 10, and consequently, as the blade rocks beneath the arm carried clip section 9, the flat wall 31 will abut one and the other of the shoulders 30 for limiting the degree of angular flop.

To more accurately determine the wiping position or inclination of the wiper there is interposed between the shoulders 30 and the flat wall 31 a rock controlling member 32 of a predetermined thickness. This control member may be interlocked to the blade by having upstanding studs 33 on the latter, or on its clip part 10, engaging in recesses 34 in the member. For silencing the contact with the shoulders 30 the control member 32 may be formed of rubber and to this end the rubber member is readily shaped from sheet stock calendered to the predetermined thickness. The width of the control member may exceed that of the wall 31 so as to bend over the rounded margins 35 upon impact with the shoulders 30. Preferably the control member 32 is normally spaced from the shoulders 30 when the blade is normal to the windshield, the extent of this clearance being a controlling factor in determining the degree of inclination for the wiping edge on its wiping stroke. The controlling member is readily removable and may therefore be replaced by one of different thickness to vary the angular displacement of the blade.

The clip sections are readily united by first arranging the locking spring within the chamber 16 and thereafter inserting the pivot pin, following which the blade may be attached to the arm by simply inserting the tongue 24 in a manner to initially depress the intermediate body portion of the spring, as shown by the broken lines in Fig. 2. As soon as the retaining lug 26 passes the shoulder 28, the spring 19 will restore the arm tongue to the full line position whereby the blade will be locked to the arm, such spring being of sufficient strength to remain operative against the urge of the arm spring 4.

The blade mounting is simple, economical of manufacture, and expeditiously assembled. It is durable of construction and efficient in use, and while the foregoing description has been given in detail for ease of understanding it is not intended by way of limitation since the inventive principles set forth therein are capable of assuming other physical embodiments without departing from the spirit of the invention and the scope of the appended claims.

What is claimed is:

1. A windshield cleaner having a wiping blade, an attaching clip having a chamber and formed with means for attaching to the outer terminal of an actuating arm, the clip having spaced bearings aligning with bearing means on the blade, a pivot pin engaged in the bearing means and the spaced bearings to hingedly connect the clip to the blade for permitting a rocking movement of the blade on its wiping edge at the beginning of its stroke to assume a rearwardly inclined position, and a spring latch within the chamber having a part laterally movable to interlock the pivot pin to the clip against pin displacement.

2. A windshield cleaner having a wiping blade, an attaching clip having articulated sections one carried by the blade and the other for engagement by an actuating arm, one clip section being formed with a chamber having an entranceway to receive the outer terminal of the actuating arm, the clip sections being formed with aligned bearings, a longitudinal pivot pin engaged in the bearings to hingedly connect the clip sections for permitting rocking action of the blade at the beginning of its stroke to assume a rearwardly inclined position, and an elongated flat spring arranged within the chamber and having its opposite end portions deflected to interlock with the pin for holding the same against displacement, the intermediate portion of the spring serving to yieldably hold the wiper arm against an opposing wall of the chamber.

3. A windshield cleaner having a wiping blade, an attaching clip having articulated sections one carried by the blade and the other for engagement by an actuating arm, one clip section being formed with a chamber and an entranceway thereto for receiving the outer terminal of the actuating arm, a longitudinal pivot pin engaged in bearings in the clip sections to hingedly connect them for permitting the blade to rock on its wiping edge at the beginning of its stroke to assume a rearwardly inclined position, and an elongated flat spring arranged within the chamber and bowed to interlock its opposite end portions with the pin to hold the latter against axial displacement, the chamber wall that opposes the pin having a convex surface to nest into a like shaped portion of the actuating arm, the intermediate portion of the spring serving to yieldably hold the arm so nested whereby the wiping blade may adjust itself on the arm.

4. A windshield cleaner having a wiping blade, an attaching clip having articulated sections one carried by the blade and the other for engagement by an actuating arm, one clip section being formed with a chamber and an entranceway thereto for receiving the outer terminal of the actuating arm, a longitudinal pivot pin engaged in bearings in the clip sections to hingedly connect them for permitting the blade to rock on its wiping edge at the beginning of its stroke to assume a rearwardly inclined position, an elongated flat spring arranged within the chamber and bowed to interlock its opposite end portions with the pin to hold the latter against axial displacement, the chamber wall that opposes the pin having a convex surface to nest into a like shaped portion of the actuating arm, the intermediate portion of the spring serving to yieldably hold the arm so nested whereby the wiping blade may adjust itself on the arm, and cooperating parts on the arm terminal and such opposing wall of the chamber held operative by the spring to secure the blade against displacement from the arm.

5. A wiper blade having longitudinally spaced upstanding ears and intervening upstanding stud means on its back edge, an arm attaching clip having end walls pivotally connected to the ears for lateral rocking about a fixed axis, the clip having rock limiting shoulders on its opposite sides opposing the back edge of the blade, and a resilient member having a recess receiving the stud means for anchoring the member on the back edge between the ears for cushioning contact with the shoulders in controlling the degree of rock of the blade relative to the clip, said shoulders holding said resilient member against dislodgment from said stud means.

6. A wiper blade having longitudinally spaced upstanding ears and an intervening pair of upstanding studs on its back edge, an arm attaching clip having end walls pivotally connected to the ears for lateral rocking about a fixed axis, the clip having rock limiting shoulders on its opposite sides opposing the back edge of the blade, and a resilient member interposed between the back edge and the shoulders for cushioning the contact therebetween in controlling the degree of rock of the blade relative to the clip, said member having spaced recesses receiving the studs, and said shoulders opposing displacement of the member from the studs.

7. A wiping blade having longitudinally spaced ears and an interposed upstanding lug on its back, a mounting clip formed with a chamber and having an entranceway to receive the outer terminal of an actuating arm, the opposite end walls of the chamber having openings alined with bearings in the ears, a pivot pin arranged in the wall openings and having its opposite ends protruding into the bearings for journaled support by the ears whereby to hingedly connect the clip for rocking action of the blade upon its wiping edge at the beginning of its stroke, means carried by the clip for holding the pin against turning in the wall openings, and a rock limiting member interposed between the clip and the blade and secured in place by the lug.

8. A wiping blade having journal bearing means in its back, an attaching clip formed with a chamber having opposed end walls provided with openings alined with the journal bearing means, a pivot pin mounted in the wall openings and journaled in the bearing means to hingedly connect the clip to the blade for rocking of the latter upon its wiping edge at the beginning of its stroke to assume a rearwardly inclined position, and a flat spring arranged within the chamber and having its opposite end portions deflected to interlock with the pin for holding the same against axial displacement, the intermediate portion of the spring bearing yieldably against an opposing wall of the chamber to exert a braking force upon the pin in the wall openings thereby to confine the turning of the pin to the journal bearing means.

9. A wiping blade, a superimposed attaching clip formed with a chamber opening toward the blade and having on its outer edge an entranceway to receive the outer terminal of an actuating arm, the clip having a convex inner wall to nest into an arcuate portion of the arm, and a flat spring arranged in the chamber and bowed against the convex wall to receive the actuating arm therebetween, the convex wall having a recess and the arm having a lug engaging in the recess and held operative by the spring against displacement of the blade from the arm while permitting adjustment of the blade upon the arm to a wiping position on an associated surface.

10. A windshield cleaner having a wiper actuating arm with its outer end formed with an arcuate tongue and urged toward the windshield surface by a spring, a wiping blade having a mounting clip formed with a chamber and an entranceway leading thereto, the top wall of the chamber having a convex surface for being nestingly received within the arcuate tongue, said tongue and said convex surface having interlocking shoulders concealed within the chamber when in nested relation, and a flat spring within the chamber acting to hold the shoulders interlocked and supported at its opposite ends at points on opposite sides of the convex surface with the spring extending substantially tangent thereto, such tangential portion of the spring being depressible between the supported spring ends when the arcuate tongue is inserted through the entranceway to hold the tongue in nested relation to the convex wall for securing the interlock.

11. A wiping blade having journal bearing means in its back, an attaching clip formed with a chamber having opposed end walls provided with openings alined with the journal bearing means, a pivot pin mounted in the wall openings and journaled in the bearing means to hingedly connect the clip to the blade for rocking of the latter upon its wiping edge at the beginning of its stroke to assume a rearwardly inclined position, said pivot pin having opposed shoulders within the chamber, and spring means arranged in the chamber and having a part engaged as a latch between the shoulders for securing the pivot pin against axial displacement.

12. A wiping blade having journal bearing means in its back, an attaching clip formed with a chamber having opposed end walls provided with openings alined with the journal bearing means, a pivot pin mounted in the wall openings and journaled in the bearing means to hingedly connect the clip to the blade for rocking of the latter upon its wiping edge at the beginning of its stroke to assume a rearwardly inclined position, said pin having spaced portions within the chamber each in the form of a peripheral groove, the adjacent sides of the grooves being beveled while the remote sides of the grooves constitute locking shoulders, and a flat spring arranged within the chamber and having its opposite ends turned inwardly into the grooves for interlocking with the locking shoulders.

13. A wiping blade having journal bearing means in its back, an attaching clip formed with a chamber having opposed end walls provided with openings alined with the journal bearing means, a pivot pin mounted in the wall openings and journaled in the bearing means to hingedly connect the clip to the blade for rocking of the latter upon its wiping edge at the beginning of its stroke to assume a rearwardly inclined position, said pin having spaced portions within the chamber each in the form of a peripheral groove, the adjacent sides of the grooves being beveled while the remote sides of the grooves constitute locking shoulders, and a flat spring arranged within the chamber and having its opposite ends turned inwardly into the grooves for interlocking with the locking shoulders, the chamber wall opposing the intermediate portion of the spring being substantially convex and leading to an entranceway from without to receive an arcuate tongue of an actuating arm, whereby the intermediate portion of the spring will yieldably hold the arcuate tongue nested upon the convex wall to interlocking secure the blade against displacement from the arm.

ROBERT B. MACPHERSON.

REFERENCES CITED

The following references are of record in the file of this patent:

UNITED STATES PATENTS

| Number | Name | Date |
|---|---|---|
| 1,703,181 | Tarver | Feb. 26, 1929 |
| 2,045,143 | Horton | June 23, 1936 |
| 2,252,510 | Horton | Aug. 12, 1941 |
| 2,270,589 | Hansen | Jan. 20, 1942 |